United States Patent [19]

Allen

[11] Patent Number: 4,554,341
[45] Date of Patent: Nov. 19, 1985

[54] FIRE RETARDANT, FAST REACTING EPOXY RESIN

[75] Inventor: Robert C. Allen, Houston, Tex.

[73] Assignee: Shell Oil Company, Houston, Tex.

[21] Appl. No.: 706,365

[22] Filed: Feb. 27, 1985

[51] Int. Cl.$^4$ ............... C08G 59/42; C08G 59/68
[52] U.S. Cl. .......................... 528/89; 528/88;
528/90; 528/93; 528/112; 528/222; 528/223;
528/224; 528/365; 528/366
[58] Field of Search ............... 528/88, 89, 90, 93,
528/112, 365, 366, 222, 223, 224

[56] References Cited

U.S. PATENT DOCUMENTS

| | | | |
|---|---|---|---|
| 2,691,007 | 10/1954 | Cass | 260/45.4 |
| 2,939,859 | 6/1960 | Rumscheidt et al. | 260/45.5 |
| 3,336,241 | 8/1967 | Shokal | 260/2 |
| 3,356,624 | 12/1967 | Neal et al. | 260/18 |
| 3,408,219 | 10/1968 | Neal et al. | 117/37 |
| 3,446,762 | 5/1969 | Lopez et al. | 260/18 |
| 3,634,542 | 1/1972 | Dowd et al. | 260/837 R |
| 3,637,618 | 1/1972 | May | 260/837 R |
| 4,284,753 | 8/1981 | Hewitt | 528/89 |
| 4,379,908 | 4/1983 | Brownscombe | 528/91 |
| 4,410,680 | 10/1983 | Brownscombe et al. | 528/88 |
| 4,436,880 | 3/1984 | Irving | 525/504 |

Primary Examiner—Earl Nielsen

[57] ABSTRACT

Heat curable epoxy-styrene compositions exhibiting improved processability, low viscosity, long pot life, and fire retardancy which when cured with a special acid anhydride/onium salt epoxy curing blend in combination with a free-radical catalyst, yield cured products exhibiting improved physical properties, such as increased heat deflection temperature, increased flexural strength and increased flexibility.

19 Claims, No Drawings

FIRE RETARDANT, FAST REACTING EPOXY RESIN

FIELD OF THE INVENTION

The present invention relates to a fire retardant composition containing a polyepoxide, unsaturated aromatic monomer, a combination of carboxyl-containing compound and halogenated anhydride curing agent, an epoxy curing accelerator and a free radical curing agent.

BACKGROUND OF THE INVENTION

Curable compositions comprising epoxy resins and styrene have generally been epoxy-polyester compositions wherein a portion of the polyester is replaced with styrene or other ethylenically unsaturated monomer. See, for example, U.S. Pat. Nos. 2,691,007, 3,574,157, and 3,634,542.

Polyether resin and styrene blends are also know. These blends generally exhibit poor processability, short pot life, high viscosity and cure with conventional curing agents to produce products which do not exhibit good physical properties; such as high heat deflection temperatures and retention of physical properties at elevated temperatures. See, for example, U.S. Pat. No. 2,939,859 directed to a polyepoxide/styrene blend cured with peroxides and/or amines. While the compositions of U.S. Pat. No. 2,939,859 do exhibit a reduction of viscosity over an epoxy composition alone, the resulting products do not exhibit high heat deflection temperatures.

Other patents covering polyepoxide/styrene compositions include U.S. Pat. Nos. 3,099,638 and 3,009,898, which are directed to the use of anhydride curing agents, optionally in the presence of a peroxide and/or tertiary amine accelerator.

Another improved composition is that disclosed in U.S. Pat. No. 4,284,753, which claims heat curable epoxy/styrene blends with a carboxyl-containing compound, curing accelerator and free-radical curing agent. However, such compositions lack sufficient flame retardancy for certain applications.

It has now been found that epoxy/styrene blends can be cured with a special curing agent/curing accelerator blend, e.g., an acid anhydride/brominated anhydride in combination with an onium salt, to yield products which exhibit unpredictibly improved physical properties, especially increased heat deflection temperatures and excellent retention of physical properties at elevated temperatures, along with fire retardancy.

SUMMARY OF THE INVENTION

The present invention is directed to an improved heat-curable epoxy-styrene blend composition, which when cured, yields compositions exhibiting improved physical properties, such as increased heat deflection temperature, increased flexural strength, increased flexibility and improved retardancy. More particularly, the invention provides a heat-curable composition comprising: (1) a polyepoxide, (2) an unsaturated aromatic monomer such as styrene, (3) a carboxyl-containing compound, (4) a halogenated acid anhydride compound, (5) a curing accelerator composition containing at least an onium salt, and (6) a free-radical curing agent.

These epoxy-styrene compositions are especially suitable for use in sheet molding compositions (SMC), in structural applications such as automotive springs, bumpers, drive shafts, etc., and in electrical laminates.

Compositions according to the present invention have a number of advantages, including rapidity of cure at elevated temperature, but with long pot life at room temperature, and rapid dissolution of the solid curatives.

DESCRIPTION OF THE PREFERRED EMBODIMENTS

It has now been found that heat curable compositions exhibiting improved physical properties, particularly improved heat deflection temperatures, increased flexural strength, increased flexibility and improved fire retardancy are obtained from blends of polyepoxides and unsaturated aromatic monomers using a unique combination of curing and accelerator mechanisms.

Accordingly, the present invention comprises a blend of (1) from about 50 to about 99 parts by weight of a polyepoxide, especially a normally liquid polyepoxide;

(2) from about 1 to about 50 parts by weight of an unsaturated aromatic monomer, preferably a styrene or substituted styrene;

(3) from about 0.25 to about 2.0 stoichiometric equivalents based on the polyepoxide of a carboxyl-containing compound, especially a polycarboxylic acid anhydride;

(4) from about 0.1 to about 1 stoichiometric equivalents based on the polyepoxide of a halogenated acid anhydride compound, especially a brominated acid anhydride;

(5) an epoxy curing accelerator composition comprising (a) from about 0.001 to about 10 parts by weight per 100 parts by weight of the polyepoxide of an onium compound and, optionally, (b) a compound selected from the group consisting of (1) stannous salts of monocarboxylic acids, (2) alkali metal hydroxides, (3) alkaline earth hydroxides, and (4) alkali metal salts, and (6) a curing amount of a free-radical curing agent.

Polyepoxides

The polyepoxides used to prepare the instant compositions comprise those compounds containing at least one vicinal epoxy group; i.e., at least one

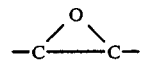

group. The polyepoxides may be saturated or unsaturated, aliphatic, cycloaliphatic, aromatic or heterocyclic and may be substituted if desired with non-interfering substituents such as halogen atoms, hydroxyl groups, either radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that the disclosure of that patent relative to examples of polyepoxides is incorporated by reference into this specification.

Other suitable polyepoxides are disclosed in U.S. Pat. Nos. 3,356,624, 3,408,219, 3,446,762 and 3,637,618 and the disclosure of these patents relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000 and more preferably an average molecular weight of from about 300 and about 1,000 and an epoxide equivalent weight of from about 140 to about 650.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or by the reaction of hydrogenated polyhydric phenols with epichlorohydrin in the presence of a suitable catalyst such as a Lewis acid, e.g., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic rings of the phenols have been or are saturated.

An idealized structural formula representing the preferred saturated epoxy compound is as follows:

Pat. No. 3,336,241. Especially preferred are the hydrogenated glycidyl ethers of 2,2-bis(4-hydroxyphenyl)propane, sometimes called the diglycidyl ethers of 2,2-bis(4-cyclohexanol)propane.

For most applications it is desirable to utilize an epoxy resin which is liquid or semi-liquid under the conditions of application. Accordingly, a blend of a liquid and solid epoxy resin may be employed. For some applications, a solid resin may be employed.

Unsaturated Aromatic Monomer

Examples of unsaturated aromatic monomers include the vinyl aromatic monomers such as styrene, substituted styrene such as alkylhalo- and nitro-substituted styrene, alpha-methylstyrene, vinyl toluene, vinyl naphthalene and the like.

Epoxy-Aromatic Monomer Blends

Usable blends of the polyepoxide and unsaturated aromatic monomer range from about 50% to 99% polyepoxide and from about 1% to 50% aromatic monomer on a weight basis.

An especially preferred range is from about 75% to about 95% polyepoxide and from about 5% to about 25% vinyl aromatic monomer.

Polycarboxyl-Containing Curing Agents

Suitable carboxyl-containing compounds include the saturated and unsaturated aliphatic, aromatic and cycloaliphatic polycarboxylic acids and polycarboxylic acid anhydrides.

Typical such carboxyl-containing compounds are trimellitic anhydride, maleic acid, maleic anhydride, crotonic acid, itaconic anhydride, tetrahydrophthalic acid, fumaric acid, phthalic anhydride, isophthalic anhydride, terephthalic anhydride, hexahydrophthalic anhydride, pyromellitic anhydride, methylated maleic adducts of phthalic anhydride, dodecenyl succinic anhydride, pryomellitic dianhydride, dimethylmaleic anhydride, n-butylmaleic anhydride, phenylmaleic anhydride, 3,3',4,4'-benzophenane tetracarboxylic dianhydride, and the like.

Preferred polycarboxylic acids and anhydrides include the normally solid acids and anhydrides having a melting point between about 150° C. and 250° C. Very suitable such acids and anhydrides include trimellitic anhydride and 3,3',4,4'-benzophenone tetracarboxylic dianhydride.

Outstanding results are obtained when trimellitic anhydride is employed as the epoxy curing agent, particularly when used as finely ground powder.

In general, a curing amount of the acid or anhydride is employed; however, depending upon the polyepoxide employed, the particular acid or anhydride used and end use considerations, the amount may vary over a wide range. A useful range is from about 0.25 to about

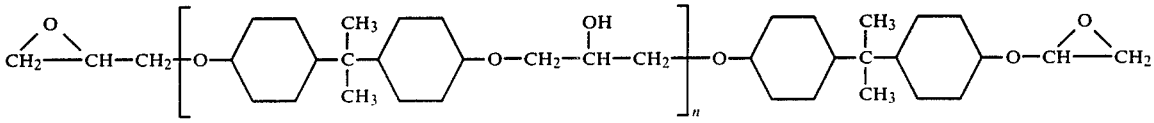

wherein n has a value so that the average molecular weight of the saturated polyepoxide is from about 350 to about 3,000.

Preferred saturated epoxy resins are the hydrogenated resins prepared by the process described in U.S.

2.0 chemical equivalents of acid or anhydride per chemical equivalent of polyepoxide. An especially suitable range when trimellitic anhydride is employed with glycidyl polyethers of BPA is from about 0.75 to about 1.5.

Halogenated Acid Anhydride Curing Agent

Suitable halogenated acid anhydride curing agents include tetrabromophthalic anhydride, chlorendic anhydride and tetrachlorophthalic anhydride. The preferred halogenated acid anhydride is tetrabromophthalic anhydride.

The amount of halogenated acid anhydride curing agent employed is about 0.1 to about 1.0 stoichiometric equivalents based on the polyepoxide, preferably about 0.1 to about 0.5 equivalents.

An important and unexpected aspect of the present invention is that a combination of two anhydrides are used, one of which must be a halogenated acid anhydride.

Curing Accelerator Composition

An essential, even critical feature of the present invention, composition, is the use of an "onium" compound as a curing accelerator. It has been found that an extremely small quantity of an onium compound produces an outstanding improvement in physical properties, particularly increased heat deflection temperature.

It has also been found that, in some instances, even better performance is achieved with a co-accelerator. Accordingly, the present compositions are directed to the use of a curing accelerator composition which contains at least an onium compound and may contain a co-accelerator.

Onium Compound

Useful onium compounds include the onium salts utilized as esterification catalysts, and preferably those containing phosphorus, sulfur or nitrogen, such as, for example, the phosphonium, sulfonium and ammonium salts of inorganic acids. Examples of these include, among others ethyl triphenyl phosphonium iodide, tetrabutyl ammonium bromide, benzyltrimethylammonium sulfate, tetramethylammonium chloride, benzyltrimethylammonium sulfate, tetramethylammonium chloride, benzyltrimethylammonium nitrate, diphenyldimethylammonium chloride, benzyltrimethylammonium chloride, diphenylmethylammonium nitrate, diphenylmethylsulfonium chloride, tricyclohexylsulfonium bromide; triphenylmethylphosphonium iodide, diethyldibutylphosphonium nitrate, trimethylsulfonium chloride, dicyclohexyldialkylphosphonium iodide, benzyltrimethylammonium thiocyanate, and the like, and mixtures thereof.

Preferred onium salts to be employed include those of the formulae:

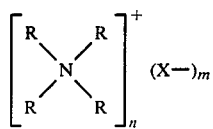

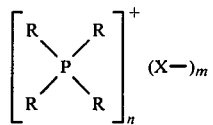

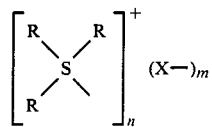

where R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, m is the valency of the X ion and n=m.

Especially preferred onium salts are the alkyl triphenylphosphonium halides such as ethyl triphenyl phosphonium iodide; quarternary ammonium halides such as tetramethyl ammonium chloride and tetrabutyl ammonium bromide.

As noted hereinbefore, the amount of onium salt can vary over a wide range, i.e., from about 0.001 to about 10.0 parts by weight per 100 parts by weight of the polyepoxide (phr). A very useful range is from about 0.005 to about 2.0 phr.

Co-Accelerators

An noted hereinbefore, only the onium salts are required as a curing accelerator for the carboxylic compound; however, for some applications, a number of co-accelerators may be employed.

Suitable such accelerators include the stannous salts of monocarboxylic acids having at least 2 carbon atoms, and more preferably from about 6 to 12 carbon atoms. Examples of operable stannous salts include, among others, stannous caproate, stannous octaote, stannous laurate, stannous palmitate, stannous stearate, stannous oleate and stannous naphthenate. Stannous octoate is particularly preferred.

Other suitable curing accelerators include the alkali metal salts such as lithium benzoate, lithium octoate, lithium naphthenate, lithium stearate, lithium neodecanoate, and the like.

Still other suitable curing accelerators (catalysts) include the hydroxides of the alkaline earth and alkali metals such as sodium hydroxide, potassium hydroxide, calcium hydroxide, etc.

The amount of co-accelerator may vary within wide limits from about 0.01 to about 10 parts per hundred by weight of polyepoxide (phr), and preferably from about 0.05 to 5.0 phr.

Free-Radical Curing Agents

Examples of such catalysts includes the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, Tetralin hydroperoxide, phenylcyclohexane hydroperoxide, tertiary butylisopropylbenzene hydroperoxide, tertiary butylperacetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobiisobutyrate, 2,2'-azobis(2,4-diamethylvaleronitrile, 2,2'-azobiisotuylamide, and the like. Particularly preferred catalysts include the diaroyl peroxide, tertiary alkyl hydroperoxides, alkyl peresters of percarboxylic acids and particularly those of the above noted groups which contain no more than 18 carbon atmos per molecular and have a decomposition below 125° C.

An especially useful peroxide is 2,5-dimethyl-2,5bis(-tertiarybutylperoxy)hexane.

It will be appreciated that the amount of free-radical catalyst (curing agent) will vary over a broad range depending upon the amount and particular vinyl monomer, type of peroxide and end-use properties, etc. In general, an effective or curing amount is employed. One skilled in the art would simply adjust the amounts of a particular peroxide to suit his process conditions. Such adjustments are made in one or two runs knowing the temperatures, half-lives, etc.

The present compositions may be prepared by various techniques, if, for example, the instant compositions are to be utilized within a short time, they can be prepared by simply mixing all the components, adding the customary additives such as fillers, reinforcement fibers, pigments, flame retardant agents, etc. and then molding and curing the resulting composition.

Under certain conditions, it may be desirable to utilize a two-package system wherein the epoxy-styrene blend is one package and the other package comprises the curing agents and accelerators. Under such conditions, it may be desirable to mix the epoxy curing agent-accelerators blend into the styrene for subsequent reaction with the polyepoxide in the presence of the peroxide. Various other modifications will become apparent to one skilled in the art.

As noted hereinfore, other materials may be mixed or added, including, plasticizers, stabilizers, extenders, oils, resins, tars, asphalts, pigments, reinforcing agents, thioxotropic agents, antioxidants.

The present compositions may be utilized in many applications such as for coatings and impregnating compositions in the preparation of adhesives for metals, wood, cement and the like, and in the preparation of reinforced composite products, such as laminated products, filament windings, sheet molding compounds (SMC), electrical laminates, molding powders, fluidized bed powders, potting compounds, etc. A very suitable application is in the preparation of reinforced products and laminates wherein the compositions are applied to fibrous products such as glass fibers or sheets and the material formed into the desired object and cured.

The following examples are given to illustrate the preparation of the instant heat-curable thermosetting compositions. It is understood that the examples are embodiments only and are given for the purpose of illustration and the invention is not to be regarded as limited to any specific components and/or specific conditions recited therein. Unless otherwise indicated, parts and percentages in the examples, are parts and percentages by weight.

Epoxy Resin A is a styrene-diluted epoxy resin containing a liquid glycidyl polyether of 2,2-bis(4-hydroxyphenyl)propane having an epoxide equivalent weight of 175–190 and an average molecular weight of about 350 (i.e., 100 parts by weight epoxy resin and 25 parts by weight styrene).

Epoxy Resin B is similar to Epoxy Resin A, but also contains 0.1 parts by weight of tetrabutyl ammonium bromide (TBAB) and 0.4 parts by weight Lupersol 101 (an organic peroxide).

Epoxy Resin C comprises 100 parts by weight of a liquid glycidyl polyether of BPA having an epoxide equivalent weight of 175–190 and an average molecular weight of about 350, 3 parts by weight BPA, 10 parts by weight styrene, 0.4 parts by weight Lupersol 101 and an inhibitor.

Curing Agent A is 95% trimellitic anhydride with 5% by weight methylhexahydrophthalic anhydride.

Curing Agent B is 85% weight ethyl methyl imidazole and 15%w 2-methyl imidazole.

EXAMPLE 1

In Example 1 a series of fire retardants were employed in styrene-diluted, trimellitic anhydride (TMA) cured epoxy resin systems.

The fire retardants evaluated were pentabromodiphenyl oxide (strictly an additive), dibromopropylacrylate (may copolymerize with styrene), and tetrabromophthalic anhydride (to replace some of the TMA) in the formulation. In addition, two other rapid curing systems were examined—a styrene-diluted, imidazole cured system and a styrene-diluted, copper tetrafluoroborate cured system.

These formulations are given in Table 1. Eight ply glass cloth laminates were made from each for evaluation. The Underwriters Laboratory UL-94V fire retardancy test was used to screen the laminates. An acceptable rating is V-0. Further properties were obtained on those laminates which passed this test and contained the least amount of bromine. Results of these tests are given in Table 2.

Pentabromodiphenyl oxide was useful with only one formulation, that of Epoxy Resin B, Curing Agent A. With other formulations, it decreased the glass transition temperature unacceptably. Tetrabromophthalic anhydride yielded a very high Tg laminate, also with Epoxy Resin B, Curing Agent A. There were indications that the solution of the tetrabromophthalic anhydride was not complete; however, this can be improved by jet milling this material. Dibromopropylacrylate imparted an unpleasant odor to formulations; in any event, it lowered Tg unacceptably or even inhibited cure entirely.

The imidazole system yields a brown-colored laminate which may not be acceptable, even ignoring the adverse effects of the liquid fire retardants. The copper tetrafluoroborate system cures quite rapidly at a low temperature (~100° C.) and is easily prepared from low viscosity resin and curing agent solution. It yields attractive laminates but is very adversely affected by the liquid fire retardants.

TABLE I
FORMULATIONS FOR FIRE RETARDANCY EVALUATION

| Sample #14500- | 7-15 | 199-8 | 197-1 | 199-9 | 197-2 | 7-16 | 199-10 |
|---|---|---|---|---|---|---|---|
| Epoxy Resin B | 100 | 100 | 100 | | | 100 | 100 |
| Curing Agent A | 41.5 | 41.5 | 41.5 | 50 | 50 | 31.1 | 35.3 |
| 1 Epoxy Resin C Curing Agent B 60% w Cu(BF$_4$)$_2$ in PEG 400 | | | | | | | |
| Epoxy Resin A | | | | 100 | 100 | | |
| TBAB | | | | 1 | 1 | | |
| Lupersol 101 | | | | 0.4 | 0.4 | | |
| Pentabromodiphenyl Oxide | 41.3 | 31.8 | 23.3 | | | | |
| Dibrompropyl Acrylate | | | | 42.9 | 31.0 | | |
| Tetrabromphthalic Anhydride | | | | | | 58.8 | 35.3 |

| Sample #14500- | 197-3 | 7-17 | 199-11 | 197-4 | * | * | 198-5 |
|---|---|---|---|---|---|---|---|
| Epoxy Resin B | 100 | | | | 100 | 100 | 100 |

TABLE I-continued
FORMULATIONS FOR FIRE RETARDANCY EVALUATION

| | | | | | | |
|---|---|---|---|---|---|---|
| Curing Agent A | 37.4 | | | | | |
| 1 Epoxy Resin C | | 100 | 100 | 100 | | |
| Curing Agent B | | | | | | |
| 60% w Cu(BF$_4$)$_2$ in | | 3 | 3 | 3 | 3 | 3 | 3 |
| Anhydride | | | | | | |

*Not made into laminates.

TABLE 2
PROPERTIES OF 8 PLY GLASS CLOTH LAMINATES

| No. | Fire Retarding Additive | % Br | % Resin | UL-94 Flam. | Tg DSC | Tan max | Dielectric Strength | Dielectric Constant |
|---|---|---|---|---|---|---|---|---|
| 14500-197-1 | Pentabromodiphenyl | 10 | 41.4 | V-1 | — | — | — | — |
| 14500-199-8 | Oxide | 13 | 37.3 | V-0 | 134° | 165° | 713 | 3.22 |
| 14500-7-15 | | 16 | 37.5 | V-0 | — | — | — | — |
| 14500-197-3 | Tetrabromophthalic | 10 | 38.5 | V-0 | 180° | 196° | 682 | 3.98 |
| 14500-199-10 | Anhydride | 15 | 46.3 | V-0 | — | — | — | — |
| 14500-7-16 | | 21 | 45.8 | V-0 | — | — | — | — |
| 14500-197-2 | Dibromopropyl | 10 | 41 | V-1 | — | — | — | — |
| 14500-199-9 | Acrylate | 13 | 36.9 | V-0 | 116° | 145° | 852 | 3.69 |
| 14500-198-5 | Dibromopropyl Acrylate | 10 | | Would Not Cure | | | | |
| 14500-197-4 | Pentabromodiphenyl | 10 | 47.3 | Fail | — | — | — | — |
| 14500-199-11 | Oxide | 15 | 48 | Fail | — | — | — | — |
| 14500-7-17 | | 20 | 49.3 | V-0 | 93° | 92° | 567 | 3.47 |
| 14500-198-6 | Pentabromodiphenyl | 10 | 35 | Fail | — | — | — | — |
| 14500-200-13 | Oxide | 15 | 43.5 | Fail | — | — | — | — |
| 14500-7-19 | | 20 | 39.4 | Fail | — | — | — | — |
| 14500-198-7 | Dibromopropyl Acrylate | 10 | | Would Not Cure | | | | |
| 14500-166 | CuTFB | — | — | — | 139.2° | 130° | 638 | 3.18 |

| No. | Dissipation Factor | Surface Resistivity, Ω | Volume Resistivity Ω-cm | Copper Peel Lbs/In | Gel Time @ 300° F. Sec. | Pot Life* RT (25° C.) |
|---|---|---|---|---|---|---|
| 14500-197-1 | — | — | — | — | — | — |
| 14500-199-8 | .0063 | 5.5 × 10$^{15}$ | 10.5 × 10$^{15}$ | 11.5 | 97.5 | ~6 Hrs. |
| 14500-7-15 | — | — | — | — | — | — |
| 14500-197-3 | .01155 | 10.8 × 10$^{15}$ | 7.81 × 10$^{15}$ | 10.43 | 89.0 | ~5 Hrs. |
| 14500-199-10 | — | — | — | — | — | — |
| 14500-7-16 | — | — | — | — | — | — |
| 14500-197-2 | — | — | — | — | — | — |
| 14500-199-9 | .01371 | 13.2 × 10$^{15}$ | 4.59 × 10$^{15}$ | 11.58 | — | — |
| 14500-198-5 | | | Would Not Cure | | | |
| 14500-197-4 | — | — | — | — | — | — |
| 14500-199-11 | — | — | — | — | — | — |
| 14500-7-17 | .00600 | 2.39 × 10$^{15}$ | 2.87 × 10$^{15}$ | 10.01 | — | — |
| 14500-198-6 | — | — | — | — | — | — |
| 14500-200-13 | — | — | — | — | — | — |
| 14500-7-19 | — | — | — | — | — | — |
| 14500-198-7 | | | Would Not Cure | | | |
| 14500-166 | .008857 | 1.16 × 10$^{15}$ | 1.17 × 10$^{15}$ | 10.0 | 9.1 | ~3 Hrs. |

*Defined as doubling of Brookfield viscosity.

| Sample #14500- | 7-19 | 200-13 | 198-6 | * | * | 198-7 |
|---|---|---|---|---|---|---|
| Epoxy Resin B | | | | | | |
| Curing Agent A | | | | | | |
| 1 Epoxy Resin C | 100 | 100 | 100 | 100 | 100 | 100 |
| Curing Agent B | | | | | | |
| 60% w Cu(BF$_4$)$_2$ in | 3 | 3 | 3 | 3 | 3 | 3 |
| PEG 400 | | | | | | |
| Epoxy Resin A | | | | | | |
| TBAB | | | | | | |
| Lupersol 101 | | | | | | |
| Pentabromodiphenyl Oxide | 40.6 | 27.7 | 16.9 | | | |
| Dibrompropyl Acrylate | | | | 53.2 | 35.3 | 21.1 |
| Tetrabromphthalic Anhydride | | | | | | |

What is claimed is:

1. A heat-curable composition comprising:
   (1) from about 50 to about 99 parts by weight of a polyepoxide possessing more than one vic-epoxy group,
   (2) from about 1 to about 50 parts by weight of an unsaturated aromatic monomer,
   (3) from about 0.25 to about 2.0 stoichiometric equivalents based on the polyepoxide of a carboxyl-containing compound,
   (4) from about 0.1 to about 1.0 stoichiometric equivalents based on the polyepoxide of a halogenated acid anhydride compound,
   (5) an epoxy curing accelerator composition comprising from about 0.001 to about 10 parts by weight per 100 parts by weight of the polyepoxide of an onium compound, and
   (6) a curing amount of a free-radical curing agent.

2. The composition of claim 1 wherein the polyepoxide is a glycidyl polyether of 2,2-bis(4-hydroxyphenyl)-propane having an average molecular weight of about 300 to about 3,000 and an epoxide euqivalent weight between about 140 and about 2,000.

3. The composition of claim 1 wherein the polyepoxide is a glycidyl polyether of hydrogenated 2,2-bis(4-hydroxyphenyl)propane.

4. The composition of claim 1 wherein the unsaturated aromatic monomer is styrene.

5. The composition of claim 1 wherein the carboxyl-containing compound is an acid anhydride having a melting point between about 150° C. and about 250° C.

6. The composition of claim 5 wherein the acid anhydride is trimellitic anhydride.

7. The composition of claim 5 wherein the acid anhydride is 3,3',4,4'-benzophenone tetracarboxylic dianhydride.

8. The composition of claim 1 wherein the halogenated acid anhydride compound is tetrabromo phthalic anhydride.

9. The composition of claim 1 wherein the onium compound is a quaternary ammonium halide.

10. The composition of claim 9 wherein the quaternary ammonium halide is tetramethyl ammonium chloride.

11. The composition of claim 1 wherein the onium compound is a phosphonium halide.

12. The composition of claim 11 wherein the phosphonium halide is ethyl triphenyl phosphonium iodide.

13. The composition of claim 1 containing at least one additional epoxy curing co-accelerator.

14. The composition of claim 13 wherein the co-accelerator is a stannous salt of a monocarboxylic acid having at least two carbon atoms.

15. The composition of claim 14 wherein the stannous salt is stannous octoate.

16. The composition of claim 1 wherein the free-radical curing agent is a peroxide.

17. The composition of claim 16 wherein the peroxide is 2,5-dimethyl-2,5-bis(tertiary-butylperoxy)hexane.

18. The composition of claim 1 containing from about 75 to about 95 parts by weight of polyepoxide and from about 5 to about 25 parts by weight of unsaturated aromatic monomer.

19. The composition of claim 1 wherein the halogenated acid anhydride compound is a brominated acid anhydride.

* * * * *